(12) United States Patent
Tah et al.

(10) Patent No.: US 11,934,421 B2
(45) Date of Patent: Mar. 19, 2024

(54) UNIFIED EXTRACTION PLATFORM FOR OPTIMIZED DATA EXTRACTION AND PROCESSING

(71) Applicant: Cognizant Technology Solutions India Pvt. Ltd., Chennai (IN)

(72) Inventors: Sachin Tah, Pune (IN); Abhinav Kolhe, College Station, TX (US)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 17/831,795

(22) Filed: Jun. 3, 2022

(65) Prior Publication Data
US 2023/0394057 A1 Dec. 7, 2023

(51) Int. Cl.
*G06F 16/25* (2019.01)
*G06F 16/28* (2019.01)

(52) U.S. Cl.
CPC .......... *G06F 16/254* (2019.01); *G06F 16/287* (2019.01)

(58) Field of Classification Search
CPC .............................. G06F 16/254; G06F 16/287
See application file for complete search history.

(56) References Cited

U.S. PATENT DOCUMENTS

| | | | |
|---|---|---|---|
| 8,897,563 B1 | 11/2014 | Welling | |
| 9,769,354 B2 | 9/2017 | Thrasher | |
| 2017/0169103 A1* | 6/2017 | Juneja | G06F 16/313 |
| 2018/0349776 A1* | 12/2018 | Raamadhurai | G06Q 40/12 |
| 2022/0100948 A1* | 3/2022 | Moyers | G06F 40/137 |
| 2022/0130163 A1* | 4/2022 | Kumar | G06F 16/93 |

* cited by examiner

*Primary Examiner* — Cam Y T Truong
(74) *Attorney, Agent, or Firm* — CANTOR COLBURN LLP

(57) ABSTRACT

The present invention provides for a system and a method for optimized data extraction of different document types. First digitised data is extracted from ingested documents based on extraction rules and is classified into first classified data based on pre-defined rules. Confidence score is assigned to first classified data based on comparison of first classified data with pre-defined data. A second digitised data is extracted from classified document types corresponding to first classified data via a tool selected from multiple integrated tools based on extraction rules. An extraction score is determined for second digitised data. Classified document types are validated based on pre-defined requirements. In the event the pre-determined requirements are met the confidence score and the extraction score are compared with pre-defined parameters. If the result is above a pre-determined threshold the second digitized data is transmitted as executable files to applications for execution.

33 Claims, 3 Drawing Sheets

UNIFIED EXTRACTION PLATFORM FOR OPTIMIZED DATA EXTRACTION AND PROCESSING

FIELD OF THE INVENTION

The present invention relates generally to the field of data extraction and processing, and more particularly, the present invention relates to a system and method for providing a unified extraction platform for optimized data extraction and processing.

BACKGROUND OF THE INVENTION

With the advent of digitization there is a growing need for processing information from myriad disparate sources and document types to extract necessary data. However, conventional tools and scanned document recognition systems that are often used to import printed information to digital devices are labor-intensive and prone to error. Also, the same device may not have the capability to extract information from all types of documents that result in inefficiencies, inconveniences and is a time consuming endeavour. It has also been observed that conventional systems cannot readily determine physical relationships (or layout) among items in documents when confronted with a variety in physical layouts of documents. Also, such systems are limited by dictionaries or pre-defined information repositories used to identify information. Further, typically, various conventional methodologies of scanned document recognition systems convert information into proprietary formats that are not easily transferable to other contact management systems. Yet further, these conventional systems are also tethered to a particular electronic device such that the document cannot be readily processed on dependent devices and then transferred in a format that is universally acceptable to user's desired device.

In light of the above-mentioned drawbacks, there is a need for a system and a method for providing a unified extraction platform for optimized data extraction and processing of documents of different types and from diverse sources. There is a need for a system and method that provides for data extraction into a format that is easily transferable to conventional contact management systems. There is a need for a system and method that provides for a seamless data extraction experience irrespective of document type and content. Also, there is a need for a system and a method for providing an integrated platform for ingesting, extracting and recognizing content of different types efficiently, effectively and accurately.

SUMMARY OF THE INVENTION

In various embodiments of the present invention, a system for optimized data extraction of different document types is provided. The system comprises a memory storing program instructions and a processor executing program instructions stored in the memory. The processor is configured to extract a first digitised data from ingested documents based on extraction rules and classify the first digitised data into a first classified data based on pre-defined rules. A confidence score is assigned to the first classified data based on a comparison of the first classified data with a pre-defined data. The processor is configured to extract a second digitised data from classified document types corresponding to the first classified data via a tool selected from multiple integrated tools for each of the classified document types based on the extraction rules, where an extraction score is determined for the second digitised data. The processor is configured to validate the classified document types based on pre-determined requirements wherein, in the event the pre-determined requirements are met, the confidence score and the extraction score are compared with pre-defined parameters. The processor is configured to transmit the second digitised data as executable files to applications for execution, wherein the second digitized data is transmitted in the event it is determined that the result of comparison is above a pre-determined threshold.

In various embodiments of the present invention, a method for optimized data extraction of different document types is provided. The method is implemented by a processor executing program instructions stored in a memory. The method comprises extracting a first digitised data from ingested documents based on extraction rules. The method comprises classifying the first digitised data into a first classified data based on pre-defined rules, wherein a confidence score is assigned to the first classified data based on a comparison of the first classified data with a pre-defined data. The method comprises extracting a second digitised data from classified document types corresponding to the first classified data via a tool selected from multiple integrated tools for each of the classified document types based on the extraction rules, wherein an extraction score is determined for the second digitised data. The method further comprises validating the classified document types based on pre-defined requirements wherein, in the event the pre-determined requirements are met, the confidence score and the extraction score are compared with pre-defined parameters. The method comprises transmitting the second digitised data as executable files to applications for execution, wherein the second digitized data is transmitted in the event it is determined that the result of comparison is above a pre-determined threshold.

In various embodiment of the present invention, a computer program product us provided. The computer program product comprises a non-transitory computer-readable medium having computer program code stored thereon, the computer-readable program code comprising instructions that, when executed by a processor, causes the processor to extract a first digitised data from ingested documents based on extraction rules. The first digitised data is classified into a first classified data based on pre-defined rules, wherein a confidence score is assigned to the first classified data based on a comparison of the first classified data with a pre-defined data. A second digitised data is extracted from classified document types corresponding to the first classified data via a tool selected from multiple integrated tools for each of the classified document types based on the extraction rules, wherein an extraction score is determined for the second digitised data. The classified document types are validated based on pre-defined requirements, wherein, in the event the pre-determined requirements are met, the confidence score and the extraction score are compared with pre-defined parameters. The second digitised data is transmitted as executable files to applications for execution, wherein the second digitized data is transmitted in the event it is determined that the result of comparison is above a pre-determined threshold.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
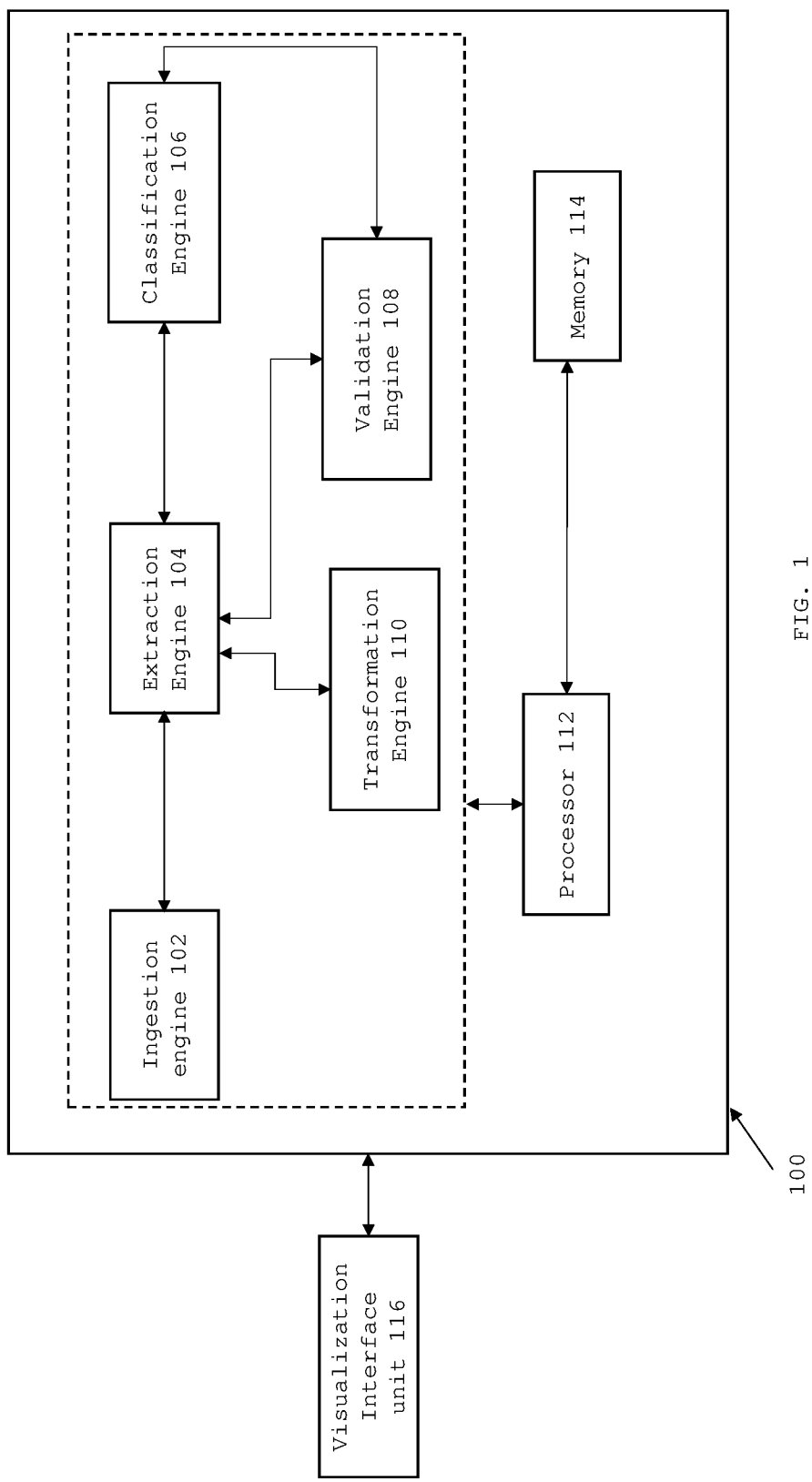
FIG. 1 is a block diagram of a system for providing a unified extraction platform for optimized data extraction and processing, in accordance with an embodiment of the present invention.

FIG. 1 is a block diagram of a system 100 for providing a unified extraction platform for optimized data extraction and processing, in accordance with various embodiments of the present invention. The system 100 is a micro-service-based architecture comprising micro-service components which communicate via an Application Programming Interface (API) gateway with a visualization interface unit 116. The API gateway is a tool that is configured between a client terminal comprising the visualization interface unit 116 and the system 100 at back-end. Examples of client terminals include a personal computer, laptop or any other wired or wireless device. In an embodiment of the present invention, the API gateway acts as a reverse proxy to accept API calls, aggregate various services of the micro-service components required to fulfil requests and return appropriate results. The system 100 provides for a unified extraction platform for optimized data extraction and processing of documents of different types and from diverse sources.

In an embodiment of the present invention, communication between the micro-service components is carried out via RabbitMQ based on an event-based mechanism. Examples of events include actions taken by the micro-services components. RabbitMQ is an open-source message-broker technique that implements an advanced message queuing protocol and may be extended with a plug-in architecture to support streaming text-oriented messaging protocol, Message Queuing (MQ) telemetry transport, and other protocols. In an embodiment of the present invention, security headers may be enabled as a security mechanism to protect the system 100 against attacks and hijacking where the security headers are configured using URL rewrite utility. In another embodiment of the present invention, Secure Socket Layer (SSL) and Transport Layer Security (TLS) enables providing a secure communication tunnel for the micro services.

In an embodiment of the present invention, the system comprises an ingestion engine 102, an extraction engine 104, a classification engine 106, a validation engine 108, and a transformation engine 110. The components of the system 100 are operated via a processor 112 specifically programmed to execute instructions stored in a memory 114 for executing respective functionalities of the components of the system 100. In an embodiment of the present invention, the system 100 may be implemented in a cloud computing architecture in which data, applications, services, and other resources are stored and delivered through shared datacenters. In an exemplary embodiment of the present invention, the functionalities of the system 100 are delivered to a user as Software as a Service (SaaS) or Platform as a Service (PaaS) over a communication network.

In another embodiment of the present invention, the system 100 may be implemented as a client-server architecture. In an embodiment of the present invention, a client terminal accesses a server hosting the system 100 over a communication network. The client terminals may include but are not limited to a smart phone, a computer, a tablet, microcomputer or any other wired or wireless terminal. The server may be a centralized or a decentralized server. The server may be located on a public/private cloud or locally on a particular premise.

In an embodiment of the present invention, the ingestion engine 102 ingests documents received via ingestion channels. Examples of ingestion channels include, but are not limited to, electronic mail, digital mailroom, via Hypertext Transfer Protocol (HTTP) or HTTPs source, via Secure File Transfer Protocol (SFTP), amazon S3® document storage, network share, google Drive®, azure Blob® storage and shared repositories. In an embodiment of the present invention, the ingestion engine 102 is configured to scan and import documents received from the ingestion channels into a source channel in the ingestion engine 102. In an exemplary embodiment of the present invention, the documents are identified as a structured type or unstructured type. In an example, the structured document may be in form of a printed document. In another example, the unstructured document may be handwritten papers, electronic emails, social media data etc.

In an embodiment of the present invention, the ingestion engine 102 is configured to monitor the ingestion channels based on pre-defined rules to ingest the documents from the ingestion channels. In an exemplary embodiment of the present invention, the pre-defined rules include collecting the documents from an ingestion channel for a pre-defined interval of time and thereafter removing the documents. In another exemplary embodiment of the present invention, the pre-defined rules are defined on the basis of an action item. For example, the action item includes details related to how to store the document, frequency at which the document is checked, pooling frequency and pooling rules for the documents. In another example, the action item relates to monitoring the documents for one or more pre-defined parameters. In an embodiment of the present invention, the pre-defined rules may be configured via the visualisation interface unit 116 and received through the API gateway. In an embodiment of the present invention, the ingestion engine 102 ingests the documents from the ingestion channels via API libraries with parameters configured to interact and receive documents from the ingestion channels. The ingestion engine 102 is configured to ingest small sized documents from ingestion channels using API calls and store the documents in a repository. The location of the repository is configured in the source channel of the ingestion engine 102.

In an embodiment of the present invention, the ingestion engine 102 is configured to ingest documents in terms of orientation images captured via mobile devices and received through ingestion channels. The ingestion engine 102 is configured to reduce noise around the image using pre-processing techniques by reducing skewness in the captured image. In an exemplary embodiment of the present invention, the pre-processing techniques may include binarization, skew correction, noise removal, thinning and skeletonization. The ingestion engine 102 is configured to store the images in shared server locations. In another embodiment of the present invention, the ingestion engine 102 is configured to ingest large sized document files from ingestion channels which are then stored in the shared server locations. The shared server locations are configured in the source channel of the ingestion engine 102. In an embodiment of the present invention, the ingested documents are transferred to a target channel of the ingestion engine 102 from the source channel for processing by the extraction engine 104 to extract a first digitized data and a second digitized data as described in later part of the specification.

In an embodiment of the present invention, the extraction engine 104 is configured to monitor the target channel to fetch the ingested documents from the ingestion engine 102 for extracting a first digitised data from the documents. In an embodiment of the present invention, the extraction engine 104 is configured to implement Optical Content Recognition (OCR) to convert the images in the ingested documents and extract the first digitized data based on extraction rules. In an exemplary embodiment of the present invention, the extraction rules are configurable extraction rules received via a Graphical User Interface (GUI) and received through API gateway, and the GUI is implemented using Angular® technology. In an embodiment of the present invention, the extraction rules include splitting the ingested documents into a plurality of pages to perform digitization and generate the first digitised data. In an example, the ingested document may have 20 pages having 3 document types like cover page (page 1), invoices (page 2 to 10) and medical records (page 11 to 20). The extraction rules split the ingested document into 3 separate individual document types viz. cover page which is 1 page long, invoice which is 9 page long, and medical records which is 10 pages long using the extraction rules. In an embodiment of the present invention, extraction rules include generating page level OCR contents and page level URLs of the split document. In an embodiment of the present invention, a plurality of split URLs is displayed via a Graphical User Interface (GUI) in the extraction engine 104. In an embodiment of the present invention, the extraction rules include merging pages of a same document type to create a new document type from OCR pages. In another exemplary embodiment of the present invention, the extraction rules include reading the ingested PDF document and breaking down the PDF document for extracting the first digitised data. In an embodiment of the present invention, the first digitised data is stored in an elastic file system in the extraction engine 104 and transaction details of the PDF documents are stored in a NoSQL database.

In an embodiment of the present invention, after digitization of the documents, the extraction engine 104 sends the extracted first digitised data to the classification engine 106. The classification engine 106 performs classification on the first digitised data to classify the first digitized data into a first classified data. In an exemplary embodiment of the present invention, the classification engine 106 is configured to implement a plurality of review workflows to classify the first digitized data into the first classified data. In an embodiment of the present invention, the classification by way of implementing review workflows is carried out based on pre-defined rules using machine learning modelling to generate the first classified data.

In an exemplary embodiment of the present invention, the pre-defined rules may include a taxonomy technique in which rules are defined for a specific field of the first digitised data to generate the first classified data. For example, the field may be invoice number, invoice number, bill number, customer invoice number etc. in the document. In another exemplary embodiment of the present invention, the pre-defined rules include validation rules specific to a field. For example, if the field is currency, then currency specific rules are applied to validate the extracted currency data against these rules to generate the first classified data.

In yet another exemplary embodiment of the present invention, the pre-defined rules include a bag of words technique to generate the first classified data. For example, in the event the first digitized data corresponds to an invoice document, then all the words in every line of the first digitized data is taken and number of occurrences of each word is counted in the first digitised data. After finding the number of occurrences of each word, certain number of words that appear more often than other words are chosen to generate the first classified data. In the event most frequent 10 words are chosen, for instance, then these words are used to generate the first classified data. In another exemplary embodiment of the present invention, the pre-defined rules may include combining the bag of words with regular expressions to combine probabilistic and deterministic approaches to generate the first classified data. In yet another exemplary embodiment of the present invention, the classification engine 106 is configured to perform classification using free text search features provide by MongoDB®.

In another embodiment of the present invention, the classification engine 106 compares the first classified data with pre-defined data to find a match. In an exemplary embodiment of the present invention, the pre-defined data includes pre-stored keywords. Based on a determination of a matches, the classification engine 106 assigns a confidence score to the first classified data. In an embodiment of the present invention, the extraction engine 104 is configured to fetch the first classified data from the classification engine 106. Based on the first classified data, the extraction engine 104 is configured to fetch the documents from the ingestion engine 102 to obtain classified document types. In an exemplary embodiment of the present invention, the extraction engine 104 is connected to tools integrated with the system 100. In an exemplary embodiment of the present invention, the tools include third-party OCR tools such as Indico's Ominipage® OCR tool, Abbyy®, Kofax®, Microsoft Azure®, Xtracta® for extracting data from the classified document types. In another exemplary embodiment of the present invention, the extraction engine 104 is connected to a SaaS based OCR tool using RestAPIs for carrying out digitization of data from the documents.

In an embodiment of the present invention, the extraction engine 104 is configured to send the classified document types to one or more of selected tools from amongst the tools integrated with the system 100 based on the extraction rules. The classified document types are sent to the selected tools for extracting a second digitised data from the classified document types. In an exemplary embodiment of the present invention, the extraction rules are received via the Graphical User Interface (GUI) through the API gateway. In another embodiment of the present invention, the extraction engine 104 receives the second digitised data from the tools in proprietary formats of the respective tools. The extraction engine 104 sends the second digitised data to the transformation engine 110 for converting the second digitised data from the proprietary format to a standard format which is pre-defined for the system 100. In an exemplary embodiment of the present invention, the transformation engine 110 modifies the second digitized data received from the tools in domain specific formats such as Commerce XML (CXML) file, E2B file, JSON file etc. In various embodiments of the present invention, the processor 112 is trained based on the first classified data and the second digitized data received from the tools such that the system 100 is a self-learning system.

In an embodiment of the present invention, the extraction engine 104 receives the second digitised data from the transformation engine 110 and is configured to determine an extraction score for the second digitised data. In an exemplary embodiment of the present invention, the extraction score is determined using a machine learning technique to represent a confidence level of the second digitised data. Using configurable routing rules, the extraction engine 104 sends the documents corresponding to the second digitised data for review. In an exemplary embodiment of the present invention, the configurable routing rules are received via the Graphical User Interface (GUI) through the API gateway. In an example, the configurable routing rules includes determining if the extraction score is below 90 percent which indicates lack of details in the classified document types. The extraction engine 104 then sends the classified document types for review to the validation engine 108. In an embodiment of the present invention, the validation engine 108 validates the classified document types based on pre-defined requirements.

In the event, the pre-defined requirements are not met, the validation engine 108 sends the classified document types to the extraction engine 104 with a message including instructions to again carry out extraction. In another embodiment of the present invention, in the event the pre-defined requirements are not met, the validation engine 108 redefines review workflows and transmits the redefined review workflows to the classification engine 106 to again carry out classification followed by extraction by the extraction engine 104. In an embodiment of the present invention, the validation engine 108 repeats the process of extraction and/or classification till the pre-determined requirements are met. In another embodiment of the present invention, the classified document types may be validated by the user via the GUI.

In an embodiment of the present invention, after it is determined that the pre-determined requirements are met, the validation engine 108 compares the extraction score and the confidence score with pre-defined parameters. In the event it is determined that result of comparison is above a pre-determined threshold, the validation engine 108 transmits the second digitised data to applications through electronic transfer for rendering and execution via the visualization user interface unit 116. In an example, the applications include downstream applications In another example, the electronic transfer may be carried out via a Straight Through Processing (STP) process. In another embodiment of the present invention, the second digitised data may be converted to executable files such as a Commerce XML (CXML) file, E2B file, JSON file etc. for execution.

Figure 2:
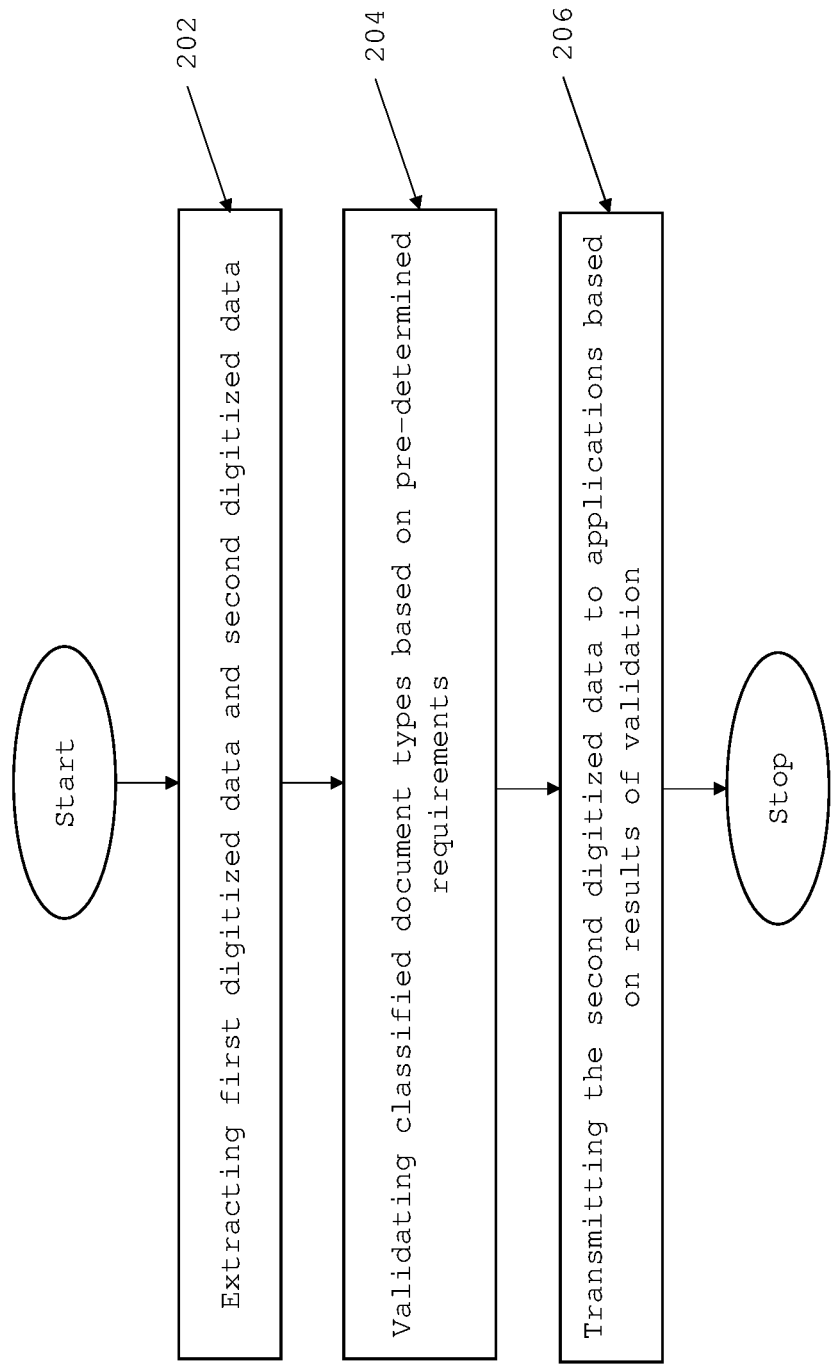
FIG. 2 is a flowchart that illustrates a method for optimized data extraction and processing via the unified extraction platform, in accordance with an embodiment of the present invention.

FIG. 2 is a flowchart illustrating a method for optimized data extraction and processing via the unified extraction platform, in accordance with an embodiment of the present invention.

At step 202, first digitized data and second digitized data are extracted. In an embodiment of the present invention, the ingested documents are received via ingestion channels. Examples of ingestion channels include, but are not limited to, electronic mail, digital mailroom, via Hypertext Transfer Protocol (HTTP) or HTTPs source, via Secure File Transfer Protocol (SFTP), amazon S3® document storage, network share, google Drive®, azure Blob® storage and shared repositories. In an embodiment of the present invention, the documents are scanned and imported from the ingestion channels into a source channel. In an exemplary embodiment of the present invention, the documents are identified as a structured type or an unstructured type. In an example, the structured document may be in form of a printed document. In another example, the unstructured document may be handwritten papers, electronic emails, social media data etc. In an embodiment of the present invention, the ingestion channels are monitored based on pre-defined rules to ingest the documents from the ingestion channels. In an exemplary embodiment of the present invention, the pre-defined rules include collecting the documents from an ingestion channel for a pre-defined interval of time and thereafter removing the documents. In another exemplary embodiment of the present invention, the pre-defined rules are defined on the basis of an action item. For example, the action item includes details related to how to store the document, frequency at which the document is checked, pooling frequency and pooling rules for the documents. In another example, the action item relates to monitoring the documents for one or more pre-defined parameters. In an embodiment of the present invention, the pre-defined rules may be configured and received through the API gateway. In an embodiment of the present invention, the documents are ingested from the ingestion channels via API libraries with parameters configured to interact and receive documents from the ingestion channels. In an embodiment of the present invention, small sized documents are ingested from ingestion channels using API calls and store the documents in a repository. The location of the repository is configured in the source channel.

In an embodiment of the present invention, the documents are ingested in terms of orientation images captured via mobile devices and received through ingestion channels. In an embodiment of the present invention, noise is reduced around the image using pre-processing techniques by reducing skewness in the captured image. In an exemplary embodiment of the present invention, the pre-processing techniques may include binarization, skew correction, noise removal, thinning and skeletonization. In an embodiment of the present invention, the images are stored in shared server locations. In another embodiment of the present invention, large sized document files are ingested from ingestion channels which are then stored in the shared server locations. The shared server locations are configured in the source channel. In an embodiment of the present invention, the ingested documents are transferred to a target channel from the source channel for processing based on the pre-defined rules to extract a first digitized data and a second digitized data.

In an embodiment of the present invention, the target channel is monitored to fetch the ingested documents for extracting the first digitised data from the documents. In an embodiment of the present invention, Optical Content Recognition (OCR) is implemented to convert the images in the ingested documents to extract the first digitized data based on extraction rules.

In an embodiment of the present invention, the extraction rules include splitting the ingested documents into a plurality of pages to perform digitization and generate the first digitised data. In an example, the ingested document may have 20 pages having 3 document types like cover page (page 1), invoices (page 2 to 10) and medical records (page 11 to 20). The extraction rules split the ingested document into 3 separate individual document types viz. cover page which is 1 page long, invoice which is 9 page long, and medical records which is 10 pages long using the extraction rules. In an embodiment of the present invention, page level OCR contents are provided and page level URLs of the split document.). In an embodiment of the present invention, pages of the same document type are merged to create a new document type from OCR pages.

In another embodiment of the present invention, the extraction rules include reading the ingested PDF document and breaking down the PDF document for extracting the first digitised data. In an embodiment of the present invention, the first digitised data is classified into a first classified data. In an embodiment of the present invention, the classification is carried out based on predefined rules using machine learning modelling to generate the first classified data. In an exemplary embodiment of the present invention, the predefined rules may include a taxonomy technique in which rules are defined for a specific field of the first digitised data to generate the first classified data. For example, the field may be invoice number, invoice number, bill number, customer invoice number etc. in the document. In another exemplary embodiment of the present invention, the predefined rules include validation rules specific to a field. For example, if the field is currency, then currency specific rules are applied to validate the extracted currency data against these rules to generate the first classified data.

In yet exemplary another embodiment of the present invention, the predefined rules include a bag of words technique to generate the first classified data. For example, in the event the first digitized data corresponds to an invoice document, then all the words in every line of the first digitized data is taken and number of occurrences of each word is counted in the first digitised data. After finding the number of occurrences of each word in the first digitised data, certain number of words that appear more often than other words are chosen to generate the first classified data. In the event most frequent 10 words are chosen, for instance, then these 10 words are used to generate the first classified data. In another exemplary embodiment of the present invention, the pre-defined rules may include combining the bag of words with regular expressions to combine probabilistic and deterministic approaches to generate the first classified data.

In another exemplary embodiment of the present invention, the first classified data is compared with pre-defined data to find a match. In an exemplary embodiment of the present invention, the pre-defined data includes pre-stored keywords. Based on a determination of a number of matches, confidence score is assigned to the first classified data. In yet another exemplary embodiment of the present invention, classification is performed using free text search features provide by MongoDB®.

In an embodiment of the present invention, based on the first classified data, the documents are fetched to obtain classified document types. In an embodiment of the present invention, the classified document types are sent to one or more of selected tools, from amongst the tools which are integrated with the system 100, based on the extraction rules. The classified document types are sent to the selected tools for extracting a second digitised data from the first classified document types based on the extraction rules. In an exemplary embodiment of the present invention, the extraction rules for selecting the tools are based on the document type i.e., a structured document type or an unstructured document type.

In another embodiment of the present invention, the second digitised data is received from the tools in proprietary formats of the respective tools. In an embodiment of the present invention, the second digitised data is converted from the proprietary format to a standard format which is pre-defined. In an exemplary embodiment of the present invention, the extracted data received from the tools is modified in domain specific formats such as Commerce XML (CXML) file, E2B file, JSON file etc.

In an embodiment of the present invention, the second digitised data is received to determine an extraction score for the second digitised data. In an exemplary embodiment of the present invention, the extraction score is determined using a machine learning technique to represent a confidence level of the second digitised data. Using configurable routing rules, the documents are sent corresponding to the second digitised data for review. In an example, the configurable routing rules includes determining if the extraction score is below 90 percent which indicates lack of details in the first classified document.

At step 204, the classified document type is validated based on pre-defined requirements. In the event, the pre-defined requirements are not met the classified document types are sent with a message including instructions to again carry out extraction. In another embodiment of the present invention, the review workflows are re-defined and transmitted to again carry out classification followed by extraction.

At step 206, the second digitised data is transmitted to applications for execution. In an embodiment of the present invention, the process of re-generating the classified document types is repeated till the pre-determined requirements are met. After it is determined that the pre-determined requirements are met, the validation engine 108 compares the extraction score and the confidence score with pre-defined parameters. In the event it is determined that the result of comparison is above a pre-determined threshold, the second digitised data is transmitted to applications through electronic transfer for execution. In another embodiment of the present invention, the second digitised data may be converted to executable files, such as, a Commerce XML (CXML) file, E2B file, JSON file etc.

Figure 3:
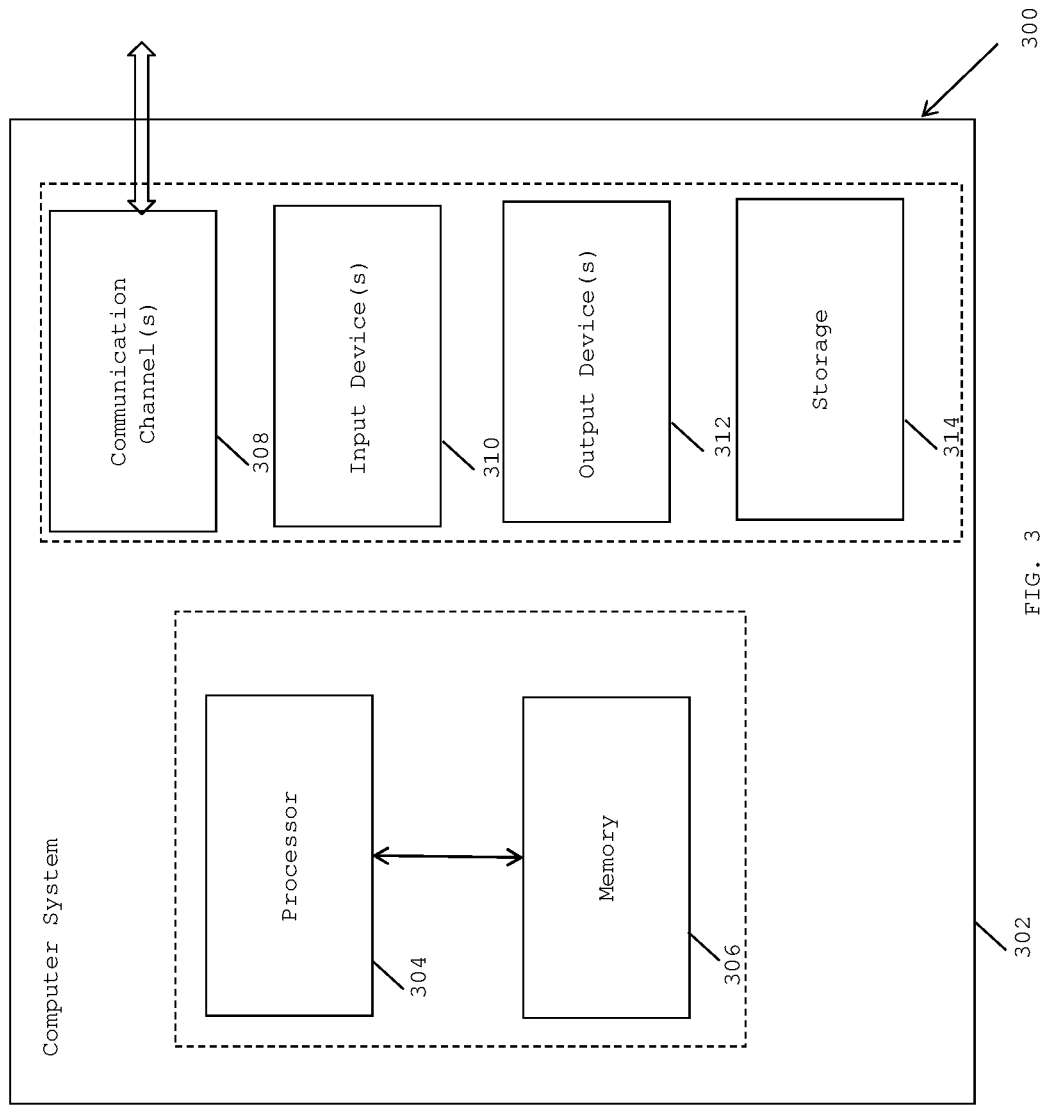
FIG. 3 illustrates an exemplary computer system in which various embodiments of the present invention may be implemented.

FIG. 3 illustrates an exemplary computer system in which various embodiments of the present invention may be implemented. The computer system 302 comprises a processor 304 and a memory 306. The processor 304 executes program instructions and is a real processor. The computer system 302 is not intended to suggest any limitation as to scope of use or functionality of described embodiments. For example, the computer system 302 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing an embodiment of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In an embodiment of the present invention, operating system software (not shown) provides an operating environment for various software executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, touch screen or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In an embodiment of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for optimized data extraction of different document types, the system comprising:
   a memory storing program instructions;
   a processor executing program instructions stored in the memory and configured to:
   extract a first digitised data from ingested documents stored in the memory based on extraction rules;
   classify the first digitised data into a first classified data based on pre-defined rules, wherein a confidence score is assigned to the first classified data based on a comparison of the first classified data with a pre-defined data;
   extract a second digitised data from classified document types corresponding to the first classified data via a tool selected from multiple integrated tools of a computer system for each classified document type of the classified document types based on the extraction rules, wherein an extraction score is determined for the second digitised data that is different from the first digitised data;
   validate the classified document types based on pre-determined requirements, wherein in an event the pre-determined requirements are met, the confidence score and the extraction score are compared with pre-defined parameters; and
   transmit the second digitised data as executable files to applications of a computer system for execution, wherein the second digitized data is transmitted in the event the extraction score is determined and a result of the comparison is above a pre-determined threshold.

2. The system as claimed in claim 1, wherein the processor ingests documents by scanning and importing documents received from ingestion channels into a source channel, wherein the ingested documents are identified as a structured type or an unstructured type, and wherein the processor monitors the ingestion channels based on pre-defined rules to ingest the documents from the ingestion channels.

3. The system as claimed in claim 2, wherein the pre-defined rules include collecting the documents from the ingestion channels for a pre-defined interval of time and thereafter deleting the documents, and wherein the pre-defined rules are defined on a basis of an action item, the action item including details related to how to store a document, frequency at which the document is checked, pooling frequency, pooling rules for the documents and monitoring the documents.

4. The system as claimed in claim 2, wherein the processor is configured to ingest the documents from the ingestion channels via Application Programming Interface (API) libraries with parameters configured to interact and receive documents from the ingestion channels, and wherein small sized documents are ingested from the ingestion channels using Application Programming Interface (API) calls and stored in a repository, and large sized documents are ingested from the ingestion channels and stored in shared server locations.

5. The system as claimed in claim 2, wherein the processor is configured to ingest the documents in terms of orientation images captured via mobile devices and received through the ingestion channels, and wherein the processor is configured to reduce noise around the images using pre-processing techniques by reducing skewness in a captured image, the pre-processing techniques including binarization, skew correction, noise removal, thinning and skeletonization.

6. The system as claimed in claim 1, wherein the processor is configured to split the ingested documents into a plurality of pages to perform digitization and generate the first digitised data based on the extraction rules.

7. The system as claimed in claim 6, wherein the processor is configured to generate page level Optical Character Recognition (OCR) contents and page level Uniform Resource Locators (URLs) of the split ingested documents based on the extraction rules.

8. The system as claimed in claim 6, wherein the processor merges pages of a same document type to create a new document type from Optical Character Recognition (OCR) pages based on the extraction rules, and wherein the processor reads the ingested documents including a Portable Document Format (PDF) document and breaks it down the ingested documents for extracting the first digitized data based on the extraction rules.

9. The system as claimed in claim 1, wherein the processor stores the first digitised data in an elastic file system and transaction details of Portable Document Format (PDF) document types are stored in a Not Only Structured QueryLanguage (NoSQL) database, and wherein the processor is configured to transfer the ingested documents from a source channel to a target channel for extraction of the first digitized data and the second digitized data.

10. The system as claimed in claim 1, wherein the extraction rules are configurable rules and are received via a Graphical User Interface (GUI) through an Application Programming Interface (API) gateway.

11. The system as claimed in claim 1, wherein the processor is configured to implement a plurality of review workflows to classify the first digitized data for obtaining the first classified data based on pre-defined rules using machine learning modelling.

12. The system as claimed in claim 11, wherein the pre-defined rules include one or more of using a taxonomy technique wherein rules are defined for a specific field of the first digitized data, validation rules specific to a field, and bag of words technique to generate the first classified data.

13. The system as claimed in claim 1, wherein the processor is configured to compare the first classified data with a pre-defined data and assign a higher confidence score to the first digitized data upon determination of a high number of matches.

14. The system as claimed in claim 1, wherein the integrated tools are Optical Character Recognition (OCR) tools connected to the system and includes Ominipage® OCR tool, SaaS based OCR tool using RestAPIs, Abbyy®, Kofax®, Microsoft Azure®, Xtracta® for extracting the second digitized data, and wherein the processor is configured to modify the second digitised data in domain specific formats including Commerce eXtensible Markup Language (CXML) and Java Script Object Notation (JSON).

15. The system as claimed in claim 1, wherein the processor is trained based on the first classified data and the second digitized data for performing classification and extraction of different document types.

16. The system as claimed in claim 1, wherein the processor sends the classified document types with a message including instructions for repeating the extraction in the event the extraction score is determined and the pre-determined requirements are not met.

17. The system as claimed in claim 1, wherein the processor redefines review workflows and transmits the redefined review workflows for repeating the classification followed by extraction in the event extraction score is determined and the pre-determined requirements are not met.

18. The system as claimed in claim 17, wherein the processor repeats the extraction and classification until the pre-determined requirements are met.

19. The system as claimed in claim 1, wherein the processor sends the second digitised data to the applications including downstream applications for executing the executable files.

20. A method for optimized data extraction of different document types, wherein the method is implemented by a processor executing program instructions stored in a memory, the method comprising:
    extracting a first digitised data from ingested documents stored in the memory based on extraction rules;
    classifying the first digitised data into a first classified data based on pre-defined rules, wherein a confidence score is assigned to the first classified data based on a comparison of the first classified data with a pre-defined data;
    extracting a second digitised data from classified document types corresponding to the first classified data via a tool selected from multiple integrated tools of a computer system for each classified document type of the classified document types based on the extraction rules, wherein an extraction score is determined for the second digitised data that is different from the first digitised data;
    validating the classified document types based on pre-determined requirements, wherein in an event the pre-determined requirements are met, the confidence score and the extraction score are compared with pre-defined parameters; and
    transmitting the second digitised data as executable files to applications of a computer system for execution, wherein the second digitized data is transmitted in the event the extraction score is determined and result of the comparison is above a pre-determined threshold.

21. The method as claimed in claim 20, wherein documents are ingested from the ingestion channels by scanning and importing the documents into a source channel, wherein the ingested documents are identified as a structured type or an unstructured type, and wherein the ingestion channels are monitored based on pre-defined rules to ingest the documents from the ingestion channels.

22. The method as claimed in claim 21, wherein the pre-defined rules include collecting the documents from the ingestion channels for a pre-defined interval of time and thereafter deleting the documents, and wherein the pre-defined rules are defined on a basis of an action item, and wherein the action item includes details related to how to store a document, frequency at which the document is checked, pooling frequency, pooling rules for the documents and monitoring the documents.

23. The method as claimed in claim 22, wherein the documents are ingested from the ingestion channels via Application Programming Interface (API) libraries with parameters configured to interact and receive documents from the ingestion channels, and wherein small sized documents are ingested from the ingestion channels using Application Programming Interface (API) calls and stored in a repository, and large sized documents are ingested from the ingestion channels and stored in shared server locations.

24. The method as claimed in claim 21, wherein the extraction rules include one or more of splitting the ingested documents into a plurality of pages to perform digitization and generating the first digitized data, providing page level Optical Character Recognition (OCR) contents and page level Uniform Resource Locators (URLs) of split document, merging pages of a same document type to create a new document type from Optical Character Recognition (OCR) pages, and reading an ingested document including Portable Document Format (PDF) documents and breaking down the ingested document for extracting the first digitized data.

25. The method as claimed in claim 21, wherein a plurality of review workflows is implemented to classify the first digitized data for obtaining the first classified data based on pre-defined rules using machine learning modelling.

26. The method as claimed in claim 25, wherein the pre-defined rules include one or more of using a taxonomy technique wherein rules are defined for a specific field of the first digitised data, validation rules specific to a field, and bag of words technique to generate the first classified data.

27. The method as claimed in claim 21, wherein the first classified data is compared with a pre-defined data and a higher confidence score is assigned to the first digitized data based on determination of a high number of matches.

28. The method as claimed in claim 21, wherein the ingested documents are transmitted from the source channel to a target channel for extraction of the first digitized data and the second digitized data, and wherein the second digitised data is modified in domain specific formats of executable including Commerce eXtensible Markup Language (CXML) and Java Script Object Notation (JSON).

29. The method as claimed in claim 21, wherein in the event the extraction score is determined and the pre-determined requirements are not met then the classified document types are sent with a message including instructions for repeating the extraction.

30. The method as claimed in claim 21, wherein in the event the extraction score is determined and the pre-determined requirements are not met, review workflows are re-defined and transmitted for repeating the classification followed by extraction.

31. The method as claimed in claim 30, wherein the extraction and classification are repeated until the pre-determined requirements are met.

32. The method as claimed in claim 21, wherein the second digitised data is sent to the applications including downstream applications for executing the executable files.

33. A computer program product comprising:
a non-transitory computer-readable medium having computer program code stored thereon, the computer-readable program code comprising instructions that, when executed by a processor, causes the processor to:
extract a first digitised data from ingested documents stored in a memory based on extraction rules;
classify the first digitised data into a first classified data based on pre-defined rules, wherein a confidence score is assigned to the first classified data based on a comparison of the first classified data with a pre-defined data;
extract a second digitised data from classified document types corresponding to the first classified data via a tool selected from multiple integrated tools of a computer system for each classified document type of the classified document types based on the extraction rules, wherein an extraction score is determined for the second digitised data that is different from the first digitised data;
validate the classified document types based on pre-determined requirements, wherein in an event the pre-determined requirements are met, the confidence score and the extraction score are compared with pre-defined parameters; and
transmit the second digitised data as executable files to applications of a computer system for execution, wherein the second digitized data is transmitted in the event the extraction score is determined and result of the comparison is above a pre-determined threshold.

* * * * *